(12) United States Patent
Bloomfield

(10) Patent No.: US 8,100,416 B1
(45) Date of Patent: Jan. 24, 2012

(54) UTILITY PUSH CART

(76) Inventor: Russell Bloomfield, N. Saint Petersburg, FL (US)

( * ) Notice: Subject to any disclaimer, the term of this patent is extended or adjusted under 35 U.S.C. 154(b) by 0 days.

(21) Appl. No.: 12/861,022

(22) Filed: Aug. 23, 2010

(51) Int. Cl.
*B62D 21/14* (2006.01)

(52) U.S. Cl. ................. 280/43.14; 280/43.1; 280/47.34; 280/47.24

(58) Field of Classification Search .............. 280/47.11, 280/47.24, 638, 639, 38, 39, 40, 645, 654; 172/14, 42; 56/16.7
See application file for complete search history.

(56) References Cited

U.S. PATENT DOCUMENTS

| | | | | |
|---|---|---|---|---|
| 1,358,235 A * | 11/1920 | Nylin | ........................ | 280/47.34 |
| 3,580,533 A * | 5/1971 | Nordland | ........................ | 248/96 |
| 3,856,211 A * | 12/1974 | Williams | ........................ | 239/685 |
| 3,873,118 A * | 3/1975 | Takagi | ........................ | 280/47.2 |
| 4,179,132 A * | 12/1979 | Rich | ........................ | 280/47.26 |
| 4,224,784 A * | 9/1980 | Hansen et al. | | |
| 4,844,175 A * | 7/1989 | Nations | ........................ | 172/680 |
| 5,048,206 A * | 9/1991 | Jones | ........................ | 37/265 |
| 5,465,987 A * | 11/1995 | DellaVecchia | ........................ | 280/47.28 |
| 5,613,354 A * | 3/1997 | Foster | | |
| 5,685,385 A * | 11/1997 | Sanuga | ........................ | 180/65.1 |
| 5,829,236 A * | 11/1998 | Ballard et al. | | |
| D403,433 S * | 12/1998 | Linden | ........................ | D24/227 |
| 5,884,462 A * | 3/1999 | Gerber | ........................ | 56/12.1 |
| D410,785 S * | 6/1999 | Leasure et al. | | |
| 5,970,692 A * | 10/1999 | Foster | ........................ | 56/12.1 |
| 6,009,694 A * | 1/2000 | Moore et al. | | |
| 6,050,069 A * | 4/2000 | Elensky | ........................ | 56/7 |
| 6,085,503 A * | 7/2000 | Hutchinson | | |
| 6,116,350 A * | 9/2000 | Notaras et al. | ........................ | 172/15 |
| 6,604,349 B2 * | 8/2003 | Deal | | |
| D532,954 S * | 11/2006 | Donaldson | ........................ | D34/24 |
| 7,168,712 B2 * | 1/2007 | Celli | ........................ | 280/47.18 |
| 7,240,891 B2 * | 7/2007 | Hafendorfer | | |
| 7,243,939 B2 * | 7/2007 | Lowe | ........................ | 280/653 |
| 7,484,737 B2 * | 2/2009 | Satorius | | |
| 7,506,403 B2 * | 3/2009 | Svoboda et al. | | |
| D612,562 S * | 3/2010 | Henderson | ........................ | D34/24 |
| 7,823,370 B1 * | 11/2010 | Wiebe et al. | ........................ | 56/12.7 |
| 2003/0151218 A1 * | 8/2003 | Swaffield | ........................ | 280/47.27 |
| 2006/0220333 A1 * | 10/2006 | Olson | | |
| 2008/0307602 A1 * | 12/2008 | Andriolo et al. | | |
| 2009/0315283 A1 * | 12/2009 | Watkins | | |

* cited by examiner

*Primary Examiner* — J. Allen Shriver, II
*Assistant Examiner* — James Triggs
(74) *Attorney, Agent, or Firm* — Jerry D. Haynes; The Law Office of Jerry D. Haynes

(57) ABSTRACT

A utility push cart comprising an elongated frame extending vertically behind a power lawn tool, where the power lawn tool rests against the elongated frame, a top bar attached to a top portion of the elongated frame and protruding horizontally from the elongated frame, a wheel connected to a bottom end of the elongated frame, an upper cage fastened below the top bar against the elongated frame, where the upper cage straps around a motor of the power lawn tool, a lower cage fastened below the upper cage along the elongated frame, where the lower cage straps a tube from the power lawn tool against the elongated frame, and a carrying means behind the elongated frame to support a mulch bag connected to the power lawn tool wherein the carrying means prevents a user from tripping over the mulch bag during use.

5 Claims, 2 Drawing Sheets

UTILITY PUSH CART

BACKGROUND OF THE INVENTION

1. Field of the Invention

The present invention relates to a push cart that enables a user to transport and use a power lawn tool while working outdoors.

2. Description of Related Art

As most gardeners or landscapers know, transporting yard tools and equipment from one location to another can be a daunting task. The task is especially difficult if the area to landscape is large or multiple yards have to be maintained. Many of the yard tools used today include a motor or engine adding even more weight for the person to carry. Some examples of modern yard tools are leaf blowers, leaf mulchers, hedge trimmers or weed trimmers. Typically the devices are carried or supported against the hands and arms of the user. Most of the time a person quickly grows tired if they are continuously working for many hours. In certain instances, a person may even injure themselves while using the tools either due to excessive strain or prolonged effort. Alternatively, a person with back problems, weakened hand or arms or other physical ailments may find it very difficult to use the tools. In some cases, the person with limited physical abilities cannot use the tools at all. Because a great deal of effort is required to use the tools, these individuals may have to seek assistance from others to maintain their own lawns, which may become expensive if the person must routinely pay someone else to care for their lawn.

It would be desirable in the art to provide a device which enables a person to more easily use power lawn tools without the stresses of carrying the tools. It would also be beneficial to have a device which may be used with more than one piece of lawn equipment.

SUMMARY OF THE INVENTION

The present invention relates to a utility push cart comprising an elongated frame extending vertically behind a power lawn tool, where the power lawn tool rests against the elongated frame, a top bar attached to a top portion of the elongated frame and protrudes horizontally from the elongated frame, a wheel connected to a bottom end of the elongated frame, an upper cage fastened below the top bar against the elongated frame, where the upper cage straps around a motor of the power lawn tool, a lower cage fastened below the upper cage along the elongated frame, where the lower cage straps a tube of the power lawn tool against the elongated frame, and a carrying means behind the elongated frame to support a mulch bag connected to the power lawn tool wherein the carrying means prevents a user from tripping over the mulch bag during use.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention provides individuals with a utility push cart specifically designed to carry and transport various types of lawn care tools like leaf blowers, leaf mulchers and edge and/or weed trimmers. The utility push cart is an adjustable device with a wheel at its base and a handle at an upper end to maneuver and transport the cart. The utility push cart also has a carrying means to support and lift a mulch bag attached to a power lawn tool. The carrying means may be a platform to rest the mulch bag upon or a strap to suspend the mulch bag. The various components of the utility push cart may be adjusted to enable different power lawn tools to be transported. Thus, a user may easily and conveniently use the lawn equipment without the strain or burden commonly associated with lawn care.

Figure 1:
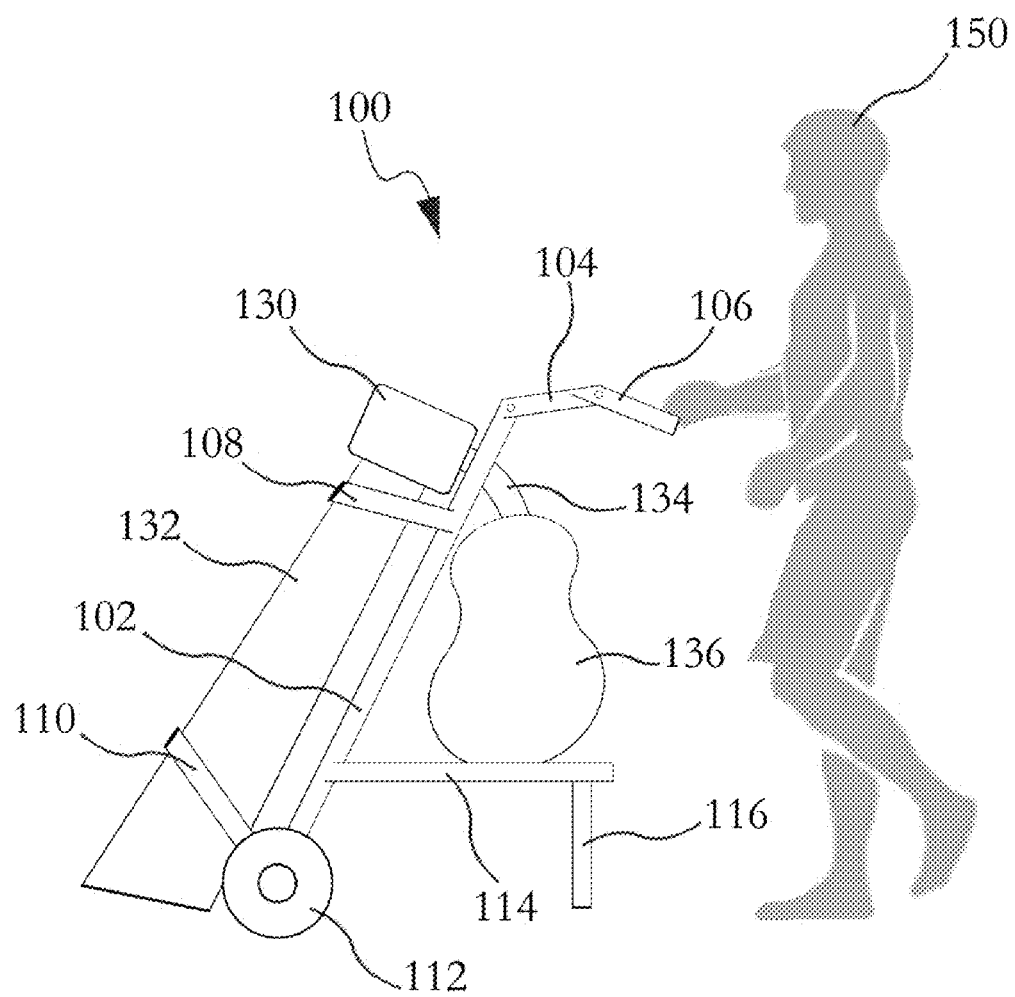
FIG. 1 depicts a perspective view of a utility push cart in accordance with an exemplary embodiment of the present invention.

Turning now descriptively to the drawings, referring to FIG. 1, a perspective view of a utility push cart (100) is shown in accordance with an exemplary embodiment of the present invention. The utility push cart (100) may comprise an elongated frame (102), a top bar (104), a handle (106), an upper cage (108), a lower cage (110) and a wheel (112). The elongated frame (102) may be attached at a lower portion to the wheel (112) and then extend vertically to meet the top bar (104) at an upper portion. A tightening screw may be used to connect the top bar (104) and the elongated frame (102) to enable the top frame (104) to bend back and forth at the point where the two elements meet. At an opposing end of the top bar (104) from the tightening screw may be the handle (106). The handle (106) allows a user (150) to comfortably maneuver the utility push cart (100). The handle (106) may be covered in plastic or rubber for a better grip for the user (150).

Along the elongated frame (102), the upper cage (108) may protrude to secure a motor (130) of a power yard tool against the elongated frame (102). The upper cage (108) may rest below the motor (130) so that it not only presses against the elongated frame (102) but also upon the upper cage (108) for a more secure fit. The power yard tool may be a leaf blower, a lawn mulcher, a weed trimmer, a hedge trimmer or another device commonly used to landscape or maintain the user's lawn or sidewalk. Attached to the elongated frame (102), below the upper cage (108), is the lower cage (110). The lower cage (110) braces a tube (132) from the power yard tool against the elongated frame (102). The upper cage (108) and the lower cage (110) may be made from a metal, a rubber strap or a plastic band to wrap around the tube (132) and adjust against the elongated frame (102). Both of the cages (108 and 110) may be adjustable to enable various power yard tools of differing lengths, sizes and weights to be interchanged.

Extending horizontally, behind where the power yard tool attaches to the elongated frame (102) may be a platform (114). The platform (114) may provide a carrying means to transport a mulch bag (136). In one particularly embodiment, the mulch bag (136) may connect to the motor (130) by a hose (134). A stand (116) may be implemented below the platform (114), where the stand (116) enables the utility push cart (100) to remain standing without being supported by the user (150). In one particular embodiment, the stand (116) folds under the platform (114) so that the user (150) does not kick it or trip on it during use. When the user (150) desires to store the utility push cart (100) for later use, the user may simply pull out the stand (116) and leave the utility push cart standing until needed again.

The elongated frame (102), the top bar (104), and the platform (114) may be comprised of steel, hard plastic or aluminum. The entire body of the utility push cart (100) may be a single wheel device, as previously described, or a double wheel device. If the utility push cart (100) is a double wheel device all of the elements have a mirrored partner on the other side of the power yard tool to create a wider base. Thus there is a first and second elongated frame, top bar, and wheel. An axle between the first and second wheels connects and supports the wheels as they roll. A connection bar may also be provided between the tightening screws were the two elongated frames and the top bars meet. Also, the handle may be a bar connecting the far end of the top bars.

Figure 2:
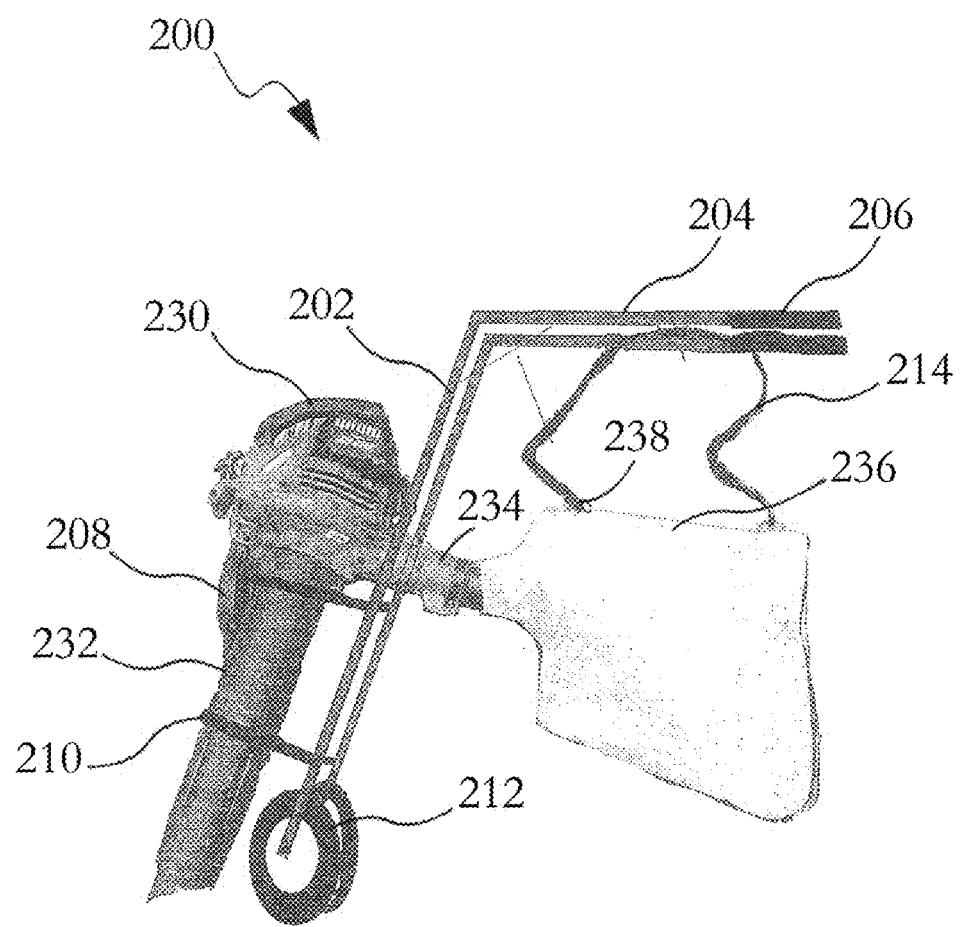
FIG. 2 depicts a perspective view of a utility push cart in accordance with an alternative embodiment of the present invention.

Now referring to FIG. 2, a perspective view of a utility push cart (200) is shown in accordance with an alternative embodiment of the present invention. The utility push cart (200) may comprise an elongated frame (202), a top bar (204), a handle (206), an upper cage (208), a lower cage (210) and a wheel (212) similarly arranged as previously described. A power lawn tool may rest against the elongated frame (202) with a tube (232) strapped against the upper cage (208) and the lower cage (210). A mulch bag (236) may extend from a motor (230), behind the elongated frame (202), connecting to the motor by a hose (234). The mulch bag (236) may be held up by an alternative carrying means wherein a strap (214) is used to wrap around the top bar (204). The strap (214) may be comprised of rubber, vinyl, cloth or canvas. By suspending the mulch bag (236) from the top bar (204), the user will not step upon or trip over any back protruding elements from the elongated frame (202). The utility push cart (100 and 200) may help the user perform outdoor landscaping tasks when they may otherwise be unable to do so either due to injuries or excessive strain while continuously carrying the power lawn tools.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A utility push cart comprising:
an elongated frame extending vertically behind a power lawn tool, where said power lawn tool rests against said elongated frame;
a top bar attached to a top portion of said elongated frame and protrudes horizontally from said elongated frame;
a wheel connected to a bottom end of said elongated frame;
an upper cage fastened below said top bar against said elongated frame, where said upper cage straps around a motor of said power lawn tool;
a lower cage fastened below said upper cage along said elongated frame, where said lower cage straps a tube from said power lawn tool against said elongated frame; and
a carrying means behind said elongated frame to support a mulch bag connected to said power lawn tool wherein said carrying means prevents a user from tripping over said mulch bag during use, wherein said carrying means is a platform and said platform has a stand pivotally connected beneath an end of said platform to enable said utility push cart to stand without support from said user.

2. The utility push cart of claim 1, wherein said top bar includes a handle attached to an end to provide said user a place to rest a pair of hands.

3. A utility push cart comprising:
an elongated frame extending vertically behind a power lawn tool, where said power lawn tool rests against said elongated frame;
a top bar attached to a top portion of said elongated frame and protrudes horizontally from said elongated frame;
a wheel connected to a bottom end of said elongated frame;
an upper cage fastened below said top bar against said elongated frame, where said upper cage straps around a motor of said power lawn tool;
a lower cage fastened below said upper cage along said elongated frame, where said lower cage straps a tube from said power lawn tool against said elongated frame; and
a platform behind said elongated frame to support a mulch bag connected to said power lawn tool wherein said platform prevents a user from tripping over said mulch bag during use, and said platform has a stand pivotally connected beneath an end of said platform to enable said utility push cart to stand without support from said user.

4. A utility push cart comprising:
an elongated frame extending vertically behind a power lawn tool, where said power lawn tool rests against said elongated frame;
a top bar attached to a top portion of said elongated frame and protrudes horizontally from said elongated frame;
a wheel connected to a bottom end of said elongated frame;
an upper cage fastened below said top bar against said elongated frame, where said upper cage straps around a motor of said power lawn tool;
a lower cage fastened below said upper cage along said elongated frame, where said lower cage straps a tube from said power lawn tool against said elongated frame; and
a carrying means behind said elongated frame to support a mulch bag connected to said power lawn tool wherein said carrying means prevents a user from tripping over said mulch bag during use, wherein said carrying means includes a stand pivotally connected beneath an end of said carrying means to enable said utility push cart to stand without support from said user.

5. The utility push cart according to claim 4, wherein said carrying means is a platform.

* * * * *